(12) United States Patent
Park et al.

(10) Patent No.: US 11,248,730 B2
(45) Date of Patent: Feb. 15, 2022

(54) PIPE SUPPORT DEVICE FOR TRANSFORMER

(71) Applicant: HYOSUNG HEAVY INDUSTRIES CORPORATION, Seoul (KR)

(72) Inventors: Chul Jun Park, Busan (KR); Kyo Ho Lee, Gimhae-si (KR); Do Jin Kim, Changwon-si (KR); Won Ho Choi, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/962,037

(22) PCT Filed: Dec. 21, 2018

(86) PCT No.: PCT/KR2018/016425
§ 371 (c)(1),
(2) Date: Jul. 14, 2020

(87) PCT Pub. No.: WO2019/151649
PCT Pub. Date: Aug. 8, 2019

(65) Prior Publication Data
US 2020/0400261 A1 Dec. 24, 2020

(30) Foreign Application Priority Data
Jan. 30, 2018 (KR) .................. 10-2018-0011337

(51) Int. Cl.
*F16L 55/035* (2006.01)
*F16F 3/087* (2006.01)
(Continued)

(52) U.S. Cl.
CPC .......... *F16L 55/035* (2013.01); *F16F 3/0873* (2013.01); *F16F 15/08* (2013.01);
(Continued)

(58) Field of Classification Search
CPC ....... F16L 55/035; F16L 3/1091; F16L 3/137; F16L 3/233; F16F 3/0873; F16F 15/08; F16F 2224/025; H01F 27/06; B60N 2/522
(Continued)

(56) References Cited

U.S. PATENT DOCUMENTS

| 622,739 | A | * | 4/1899 | Wahlert | ..... F16L 3/10 |
| | | | | | 248/74.4 |
| 2,396,837 | A | * | 3/1946 | Herman | ..... F16L 3/1008 |
| | | | | | 174/40 CC |

(Continued)

FOREIGN PATENT DOCUMENTS

| JP | 2008-196542 A | 8/2008 |
| KR | 20-0288735 Y1 | 9/2002 |

(Continued)

*Primary Examiner* — Nkeisha Smith
(74) *Attorney, Agent, or Firm* — Novick, Kim & Lee, PLLC; Jae Youn Kim (57) ABSTRACT

A pipe support device for a transformer is proposed. A brace having a grid shape and serving as a reinforcing member is provided on the surface of an outer housing constituting the exterior of the transformer. Supports are installed at predetermined intervals on the brace to be orthogonal thereto. A support base is positioned on each of the supports, and a pipe holder is coupled to the support base to support a pipe. An elastic supporting pad is positioned between the support base and the pipe and opposite flange portions of the pipe holder are seated on and coupled to the elastic supporting pad. An elastic close-contact pad is positioned between the pipe and an arched portion of the pipe holder and is brought into close contact with the pipe.

6 Claims, 5 Drawing Sheets

(51) Int. Cl.
  *F16F 15/08* (2006.01)
  *F16L 3/10* (2006.01)
  *H01F 27/06* (2006.01)

(52) U.S. Cl.
  CPC ............ F16L 3/1091 (2013.01); H01F 27/06 (2013.01); *F16F 2224/025* (2013.01)

(58) Field of Classification Search
  USPC .............. 248/636, 69, 62, 73, 74.1, 72, 74.4
  See application file for complete search history.

(56) References Cited

U.S. PATENT DOCUMENTS

| | | | | |
|---|---|---|---|---|
| 2,683,578 | A * | 7/1954 | Rainey | H01B 17/306 |
| | | | | 248/68.1 |
| 3,243,151 | A * | 3/1966 | Varney | F16L 3/1207 |
| | | | | 248/74.1 |
| 3,606,218 | A * | 9/1971 | Enlund et al. | F16L 55/035 |
| | | | | 248/74.2 |
| 4,323,088 | A * | 4/1982 | McClellan | F16L 59/135 |
| | | | | 138/106 |
| 4,784,363 | A * | 11/1988 | Brown | F16L 55/035 |
| | | | | 248/610 |
| 4,804,158 | A * | 2/1989 | Collins | F16L 59/135 |
| | | | | 248/74.4 |
| 6,679,460 | B2 * | 1/2004 | Nicolia | F16L 3/133 |
| | | | | 248/316.5 |
| 7,722,001 | B2 * | 5/2010 | Trotter | F16L 3/1207 |
| | | | | 248/65 |
| 7,770,848 | B2 * | 8/2010 | Johnson | F16L 55/035 |
| | | | | 248/65 |
| 8,313,065 | B2 * | 11/2012 | Birch | F16L 3/1016 |
| | | | | 248/74.4 |
| 8,497,592 | B1 * | 7/2013 | Jones | F03D 9/25 |
| | | | | 290/44 |
| 8,608,145 | B1 * | 12/2013 | Ripple, Jr. | F16L 3/1091 |
| | | | | 269/287 |
| 8,870,132 | B2 * | 10/2014 | Sampson | F16L 3/22 |
| | | | | 248/74.1 |
| 8,985,533 | B2 * | 3/2015 | Edmond | F16L 3/1222 |
| | | | | 248/68.1 |
| 9,038,968 | B2 * | 5/2015 | Hennon | F16L 3/1016 |
| | | | | 248/73 |
| 9,297,479 | B2 * | 3/2016 | Kato | F16L 3/12 |
| 9,447,899 | B2 * | 9/2016 | Minami | F16L 5/025 |
| 9,464,734 | B2 * | 10/2016 | Okura | H02G 3/22 |
| 9,500,248 | B2 * | 11/2016 | Schmid | F16F 7/108 |
| 9,605,773 | B1 * | 3/2017 | Tarapchak | F16L 3/1091 |
| 9,646,761 | B2 * | 5/2017 | Lin | H01F 27/33 |
| 9,714,726 | B1 * | 7/2017 | Laidley | F16L 3/00 |
| 9,739,070 | B2 * | 8/2017 | Bushore | E04C 3/30 |
| 9,903,512 | B2 * | 2/2018 | Sixsmith | F16L 3/243 |
| 9,982,824 | B2 * | 5/2018 | Koenig | F16L 3/1075 |
| 10,190,703 | B2 * | 1/2019 | Alquier | F16L 3/10 |
| 10,262,791 | B2 * | 4/2019 | Ettl | H01F 27/40 |
| 10,612,695 | B2 * | 4/2020 | Kempf | F16L 7/00 |
| 10,914,405 | B2 * | 2/2021 | Dodge | F16L 5/00 |
| 2015/0184415 | A1 * | 7/2015 | Bushore | E04C 3/30 |
| | | | | 52/831 |
| 2018/0023729 | A1 * | 1/2018 | Alquier | F16L 3/1207 |
| | | | | 248/74.4 |

FOREIGN PATENT DOCUMENTS

KR        20-0403758 Y1    12/2005
KR   20-2007-0000365 U     3/2007
KR      10-1062607 B1     9/2011

* cited by examiner

PIPE SUPPORT DEVICE FOR TRANSFORMER

TECHNICAL FIELD

The present invention relates generally to a pipe support device used in a transformer. More particularly, the present invention relates to a pipe support device for a transformer, which is configured to absorb vibration while supporting a pipe provided on the surface of an outer housing of the transformer.

BACKGROUND ART

A transformer is a converter that changes the magnitude of alternating voltage and current by using electromagnetic induction. Pipes for various purposes are installed on the outer part of an outer housing that constitutes the appearance of the transformer so as to cool and maintain insulating oil. Each of such pipes has a predetermined length, and fluid flows through the inside thereof, so vibration is likely to occur in the pipe. In addition, vibration generated in the outer housing is transmitted to the pipe, so vibration and noise may occur in the pipe.

The vibration generated in the pipe causes wear of a valve connected to the pipe, thereby reducing the durability of the valve, increasing the replacement cost of the valve, and causing the malfunction of instruments connected to the middle of the valve. Accordingly, the serious problem that the transformer is stopped from operating may occur. Furthermore, the vibration of the pipe generates noise, causing noise problems in the area in which the transformer is installed.

Accordingly, the pipe positioned on the outer surface of the outer housing of the transformer is required to be uninfluenced by the environment of the outer housing such as heat transmitted from the outer housing.

DISCLOSURE

Technical Problem

An objective of the present invention is to solve the above problems occurring in the prior art and to support a pipe such that vibration does not occur in the pipe provided on an outer surface of an outer housing of a transformer.

Another objective of the present invention is to prevent the influence of heat generated in the outer housing from being transmitted to the pipe.

Technical Solution

According to the characteristics of the present invention in order to accomplish the above objectives, the present invention provides a pipe support device for a transformer provided on an outer surface of an outer housing constituting an exterior of the transformer to support a pipe, the device including: a support base positioned on each of supports fixed to the outer housing; an elastic supporting pad seated on the support base and made of an elastic material; a pipe holder having an arched portion partially surrounding the pipe while the pipe is positioned on the elastic supporting pad, a flange portion of each of opposite ends of the arched portion being coupled to the support base; and an elastic close-contact pad brought into close contact with the pipe holder and an outer surface of the pipe therebetween by the arched portion of the pipe holder, the elastic close-contact pad being made of an elastic material.

The arched portion may be configured to have an arched shape and bring the elastic close-contact pad into close contact with the outer surface of the pipe, the arched portion being configured to be orthogonal to the flange portion.

A corrugated pattern may be provided on a surface of the elastic close-contact pad.

The pattern may be provided on the surface of the elastic close-contact pad being in close contact with the pipe.

At least one end part of the elastic close-contact pad may be connected to the elastic supporting pad to be integral thereto.

The supports may be located at predetermined intervals on a reinforcing member provided on the surface of the outer housing.

An interval between the supports may be determined according to natural frequency of the outer housing to stop the pipe from resonating with the outer housing.

Advantageous Effects

The pipe support device for a transformer according to the present invention can achieve the following effects.

In the present invention, the elastic supporting pad having elasticity is arranged between the support base and the pipe, and the elastic close-contact pad having elasticity is arranged between the pipe holder and the pipe. Particularly, the elastic close-contact pad being in close contact with the pipe by partially surrounding most of the outer surface of the pipe has a corrugated pattern formed on the surface thereof. Accordingly, the transmission of vibration and noise is blocked by the elastic supporting pad and the elastic close-contact pad. Particularly, the transmission of vibration and noise is more reliably blocked by the pattern of the elastic close-contact pad.

In addition, in installing the pipe support device of the present invention, supports are provided, and the support base is arranged on each of the supports. Particularly, the support is located on the brace of the outer housing, and the pipe is spaced apart from the outer housing by at least a predetermined interval by the support. Accordingly, the pipe is not influenced by the environment of the outer housing, and due to the installation of the support on the brace, noise and vibration transmitted from the outer housing to the pipe are minimized.

Furthermore, in the present invention, the support base connected to the support and the pipe holder bringing the elastic close-contact pad into close contact with the pipe are separately provided, and the elastic supporting pad is positioned between the pipe and the support base. Accordingly, the transmission of vibration and noise between the support base and the pipe holder is blocked by the elastic supporting pad. Due to the blocking of the transmission of vibration and noise between the pipe and the pipe holder by the elastic close-contact pad, the present invention can reliably reduce the transmission of vibration and noise as a whole.

MODE FOR INVENTION

Hereinbelow, an embodiment of the present invention will be described in detail with reference to the accompanying drawings. It should be noted that in adding reference numerals to the components of each drawing, the same components have the same reference numerals as possible even though they are displayed on different drawings. In addition in describing the embodiment of the present invention, when it is determined that detailed descriptions of related well-known structures or functions hinder understanding of the embodiment of the present invention, detailed descriptions thereof will be omitted.

In addition, in describing the components of the embodiment of the present invention, terms such as first, second, A, B, (a), and (b) may be used. These terms are only for distinguishing the components from other components, and the nature or order of the components is not limited by the terms. When a component is described as being "connected" or "coupled" to another component, the component may be directly connected to or coupled to the another component, but it should be understood that still another component may be "connected" or "coupled" thereto between each component.

As illustrated in the drawings, the pipe support device of the present invention is configured to block the generation of noise and vibration in supporting a pipe 1. The pipe support device of the present invention is installed in the middle of the pipe 1 which is cylindrical and has a predetermined length, and functions to support the pipe 1 in a specific position.

A pipe holder 10 is configured to surround at least half of the outer surface of the pipe 1. Of course, the pipe holder 10 does not directly surround the pipe 1, but an elastic close-contact pad 32 that will be described later herein is disposed between the pipe holder and the outer surface of the pipe 1. The pipe holder 10 has an arched portion 12 partially surrounding the pipe 1, and a flange portion 14 is provided at each of the opposite ends of the arched portion 12. The flange portion 14 has a flat plate shape. The flange portion 14 is connected to the arched portion 12 to be orthogonal thereto. The flange portion 14 has a coupling hole 16 formed therein to be coupled to a support base 18 that will be described later herein. The coupling hole 16 is configured to have a circular shape in the illustrated embodiment, but may have the shape of a longitudinal hole. That is, the coupling hole 16 may be formed as a longitudinal hole in which a longitudinal axis is formed along a direction toward the flange portion 14 from the arched portion 12. Thus, when the coupling hole 16 is formed as the longitudinal hole, the same support device can be used even when the diameters of pipes 1 are somewhat different; pressure applied to the surface of the pipe 1 by the arched portion 12 can be controlled; and an area around which the arched portion 12 partially surrounds the pipe 1 can be controlled. Therefore, even when there are some dimensional tolerances, the longitudinal coupling hole 16 can cover the dimensional tolerances.

The support base 18 is made of the same material as the material of the pipe holder 10, for example, stainless steel. The flange portion 14 of the pipe holder 10 and the opposite ends of the support base 18 are coupled to each other. In the embodiment, the support base 18 is configured to have a flat plate shape. Particularly, in the embodiment, the support base 18 is configured to have a rectangular plate shape. A through hole 19 is formed in a position of each of the opposite ends of the support base 18, the position corresponding to the position of the coupling hole 16. The support base 18 is coupled to the pipe holder 10, and functions to prevent the pipe 1 from being separated from the pipe holder 10. An elastic supporting pad 30 that will be described later herein is provided between the support base 18 and the pipe holder 10.

The coupling of the support base 18 and the pipe holder 10 to each other is performed by a fastener 20 fastened by passing through the coupling hole 16 formed in the flange portion 14 of the pipe holder 10 and the through hole 19 of the support base 18. The fastener 20 is composed of a bolt 22 and a nut 24. However, the fastener 20 is not necessarily composed of the bolt 22 and the nut 24, and may be composed of anything as long as the support base 18 and the flange portion 14 of the pipe holder 10 can be coupled to each other. In the embodiment, the fastener 20 is composed of the bolt 22 and the nut 24, and at least two nuts 24 are used so as to prevent the nut 24 from being loosened from the bolt 22 by vibration.

Meanwhile, while supporting the pipe 1, the elastic supporting pad 30 is installed to be positioned between the support base 18 and the flange portion 14 of the pipe holder 10. The elastic supporting pad 30 is preferably made to have the same shape as the support base 18. The elastic supporting pad 30 is made of an elastic material such as rubber to absorb vibration and noise. The elastic supporting pad 30 is in close contact with the support base 18 and the pipe 1 therebetween to block the transmission of vibration and noise. At the same time, the elastic supporting pad 30 is located between the support base 18 and the flange portion 14 of the pipe holder 10 and blocks the transmission of vibration and noise therebetween. To this end, a through hole 31 such as the through hole 19 of the support base 18 is formed in each of the opposite end parts of the elastic supporting pad 30, so that the bolt 22 of the fastener 20 passes therethrough.

The elastic close-contact pad 32 is located between the arched portion 12 of the pipe holder 10 and the pipe 1 to be in close contact with at least half of the outer surface of the pipe 1. In the embodiment, opposite end parts of the elastic close-contact pad 32 are configured to extend to the surface of the elastic supporting pad 30. However, each of the opposite end parts of the elastic close-contact pad 32 need not necessarily extend to the elastic supporting pad 30.

In addition, the elastic supporting pad 30 and the elastic close-contact pad 32 are made separately in the embodiment, but the end part of the elastic close-contact pad 32 may be connected to the elastic supporting pad 30 to be formed integrally thereto. Thus, when the elastic supporting pad 30 and the elastic close-contact pad 32 are formed integrally to each other, the total number of parts is reduced, and the operation of mounting the pipe holder 10 to the pipe 1 can be relatively easy.

Figure 1:
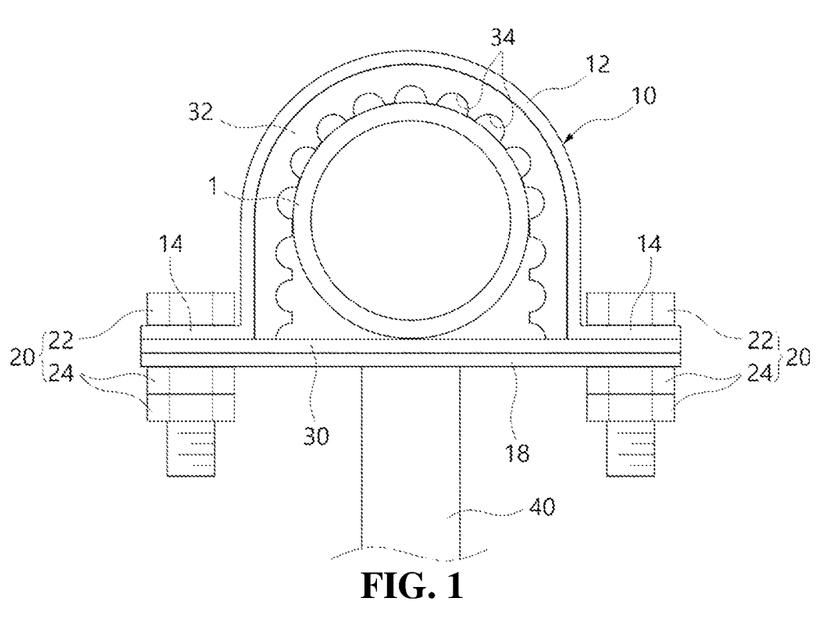
FIG. 1 is a sectional view illustrating a pipe support device for a transformer according to an exemplary embodiment of the present invention.
Figure 2:
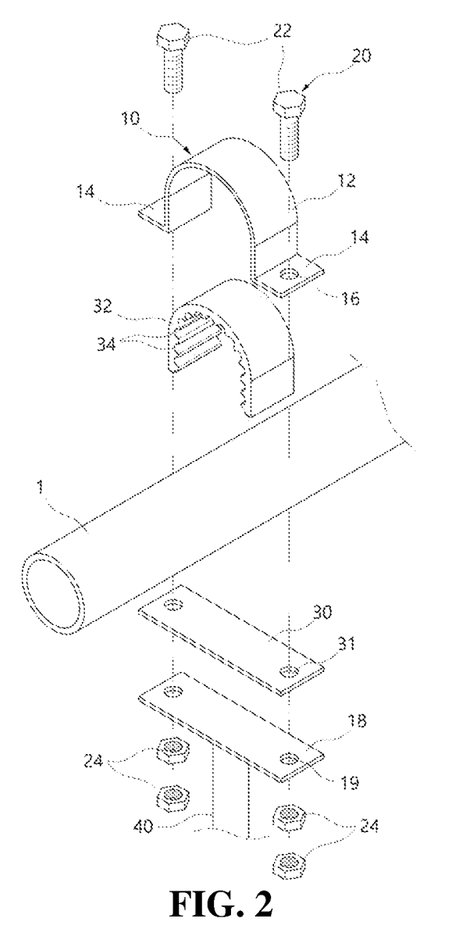
FIG. 2 is an exploded perspective view illustrating the configuration of the pipe support device according to the embodiment of the present invention.
Figure 3:
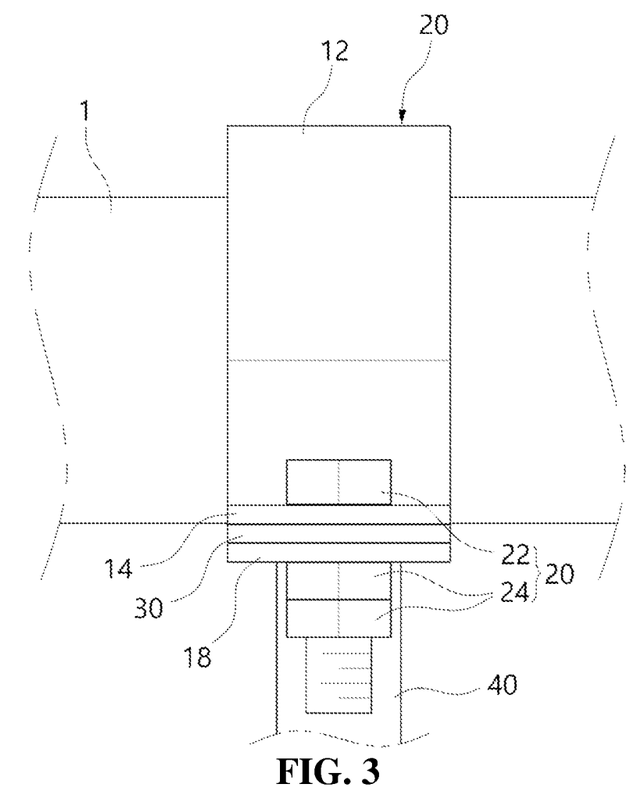
FIG. 3 is a side view illustrating the pipe support device according to the embodiment of the present invention.
Figure 4A:
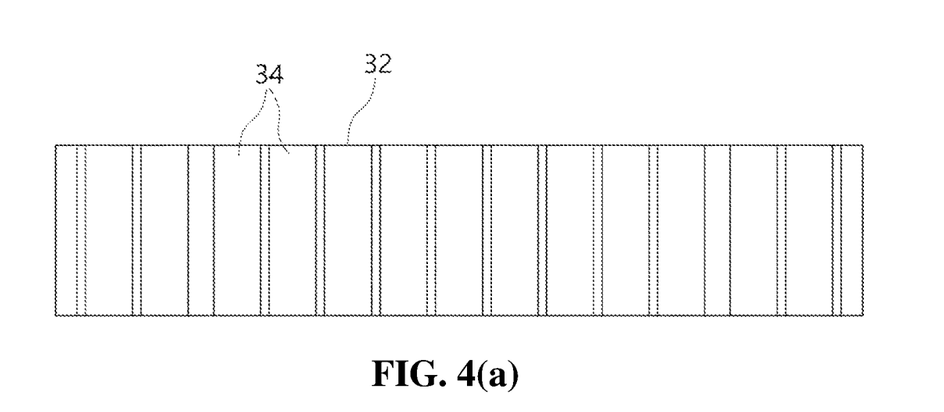
FIGS. 4(a)-4(b) show top plan views illustrating the type of patterns formed in an elastic close-contact pad constituting the pipe support device according to the embodiment of the present invention.
Figure 4B:
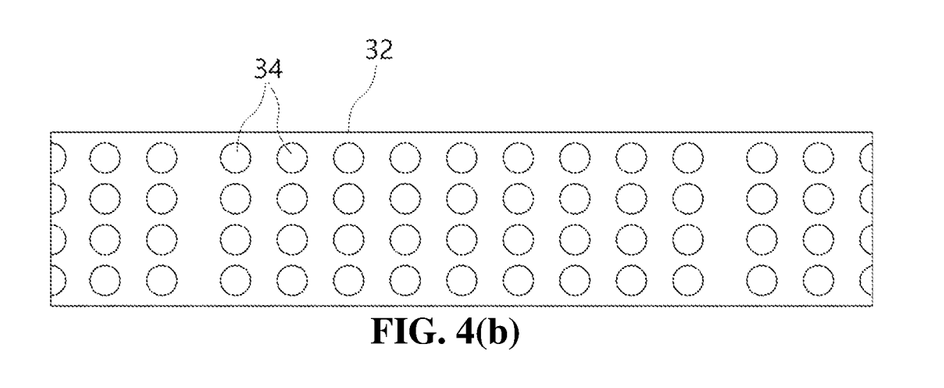

A pattern 34 is formed on a surface of the elastic close-contact pad 32. The pattern 34 may be formed to have a corrugation shape. FIGS. 4(a)-4(b) illustrate the shapes of the pattern 34. In FIG. 4(a), the pattern 34 has the shape of a longitudinal channel and is configured alongside the pipe 1 in the longitudinal direction thereof. In FIG. 4(b), the pattern 34 is configured to have the shape of circular grooves.

The pattern 34 decreases a vibration transmission rate by reducing a contact area between the pipe 1 and the elastic close-contact pad 32. That is, the rigidity of the elastic close-contact pad 32 is reduced by reducing the contact area, thereby reducing the transmission of vibration and noise.

Meanwhile, in the illustrated embodiment, the pattern 34 is formed on the surface of the elastic close-contact pad 32 in close contact with the pipe 1, but may be formed on a surface opposite the surface, that is, on a surface in close contact with the pipe holder 10.

The support base 18 is installed on the support 40 mounted to an outer housing 52 that will be described later herein. The support base 18 is configured to be integral to the support 40. The support 40 protrudes from the outer surface of the outer housing 52 to be orthogonal thereto, and the protruding length is set such that heat is not transferred from the outer housing 52 to the pipe 1.

Figure 5:
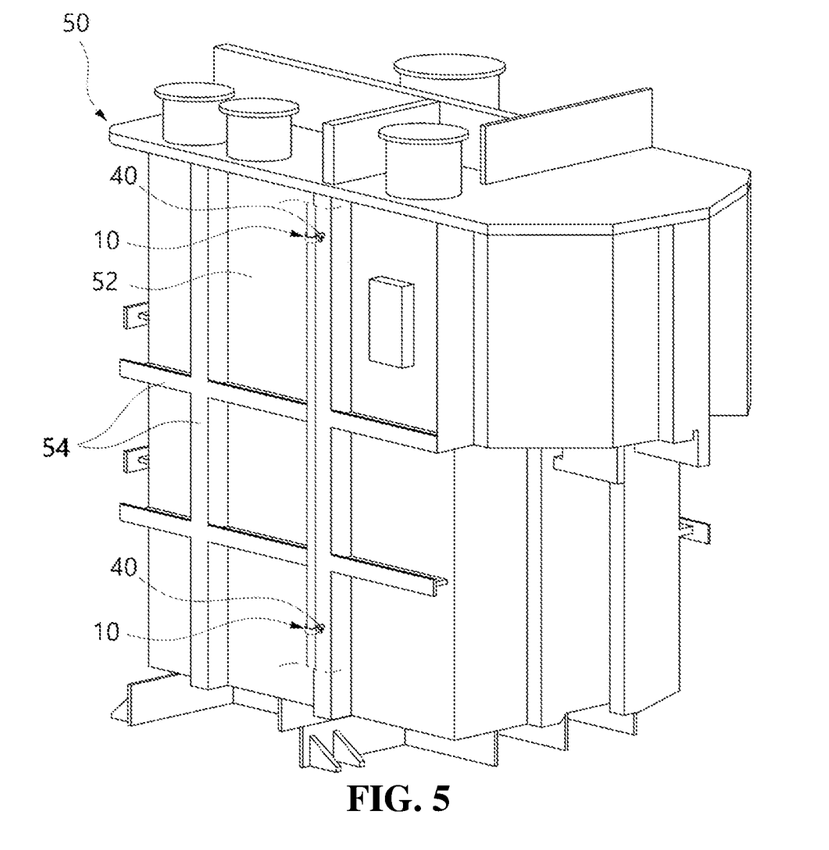
FIG. 5 is a perspective view illustrating the pipe support device installed on an outer housing of the transformer according to the embodiment of the present invention.

Next, in the present invention, FIG. 5 illustrates the pipe 1 mounted to the outer housing 52 of a transformer 50. A brace 54 as a reinforcing member is installed as a grid shape on the outer surface of the outer housing 52 to increase the rigidity of the outer housing 52. The support 40 is provided on the brace 54, and the support base 18 is seated on the support 40.

Hereinafter, the use of the pipe support device for a transformer according to the present invention having the configuration as described above will be described in detail.

As illustrated in FIG. 5, the pipe support device of the present invention is installed on the brace 54 provided on the outer surface of the outer housing 52. The support 40 is fixedly installed on the brace 54. An interval between the supports 40 is related to the natural frequency of the outer housing 52. The interval between the supports 40 is determined such that the supports do not resonate with the outer housing 52, and the pipe 1 is supported by the supports.

In the pipe support device of the present invention, while the elastic supporting pad 30 is placed on the support base 18, and the pipe 1 is positioned on the elastic supporting pad 30, the pipe holder 10 is fastened to the support base 18.

The bolt 22 passes through the corresponding holes of the flange portion 14 of an end part of a side of the pipe holder 10, the elastic supporting pad 30, and the support base 18, and the nut is fastened to the bolt 22 to hold the pipe. When this operation is performed on the opposite end parts of the pipe holder 10, the pipe 1 is held by the pipe holder 10 including the support base 18.

In this case, while the elastic close-contact pad 32 is compressed between the pipe 1 and the arched portion 12 of the pipe holder 10, and the elastic supporting pad 30 is compressed between the flange portions 14 of the opposite end parts of the pipe holder 10 and the support base 18, a side of the pipe 1 is seated on the elastic supporting pad 30.

When this is done, the elastic supporting pad 30 can prevent the transmission of vibration and noise between the pipe holder 10 and the support base 18. Of course, the elastic supporting pad 30 also blocks the transmission of vibration and noise between the pipe 1 and the support base 18.

A part which has the largest area being in contact with the outer surface of the pipe 1 is the elastic close-contact pad 32. The elastic close-contact pad 32 is installed between the arched portion 12 of the pipe holder 10 and the pipe 1. Furthermore, the pattern 34 is formed on the elastic close-contact pad 32. The pattern 34 is formed in the corrugation shape on the surface of the elastic close-contact pad 32. Such a pattern 34 lowers the rigidity of the elastic close-contact pad 32 to reduce the transmission of vibration and noise between the pipe 1 and the pipe holder 10.

Meanwhile, when the coupling hole 16 provided in the flange portion 14 of the pipe holder 10 is configured as a longitudinal hole, the arched portion 12 can more reliably bring the elastic close-contact pad 32 into close contact with the outer surface of the pipe 1, particularly, with at least half of the outer surface of the pipe 1 in the circumferential direction thereof while correcting errors due to the diameter of the pipe 1, or the tolerance of the pipe 1 or the pipe holder 10.

In addition, in the case that the elastic supporting pad 30 and the elastic close-contact pad 32 are made integrally to each other, when the elastic supporting pad 30 and the elastic close-contact pad 32 provided integrally to each other are coupled to the pipe holder 10 and the support base 18 therebetween, the operation of fixing or positioning the elastic close-contact pad 32 is not required when the elastic close-contact pad 32 is assembled since a portion of the elastic close-contact pad 32 is connected to the elastic supporting pad 30. Accordingly, the assembly work can be rapidly performed.

In the above, all the components constituting the embodiment of the present invention are described as being coupled to each other as one or being operated in the coupled state, but the present invention is not necessarily limited to the embodiment. That is, if it is within the scope of the present invention, at least one of all of the components may be selectively combined and operated. In addition, the terms such as "include", "compose", or "have" as described above means that the corresponding components can be inherent unless specifically stated to the contrary. Accordingly, it should be interpreted that other components are not excluded, but may further be included. All terms, including technical or scientific terms, have the same meaning as generally understood by those skilled in the art to which the present invention belongs, unless otherwise defined. Commonly used terms, such as predefined terms, should be interpreted as being consistent with the contextual meaning of the related art, and are not to be interpreted as ideal or excessively formal meanings unless explicitly defined in the present invention.

The above description is only to illustrate the technical idea of the present invention, but those skilled in the art to which the present invention pertains will be able to make various modifications and variations without departing from the essential characteristics of the present invention. Accordingly, the embodiment disclosed in the present invention is not intended to limit the technical spirit of the present invention, but to explain it, and the scope of the technical spirit of the present invention is not limited to the embodiment. The scope of protection of the present invention should be interpreted by the scope of the claims below, and all technical spirits within the scope equivalent thereto should be interpreted as being included in the scope of the claims of the present invention.

The invention claimed is:

1. A pipe support device for a transformer including an outer housing, the pipe support device being configured to support a pipe at an outer surface of the outer housing, the pipe support device comprising:
   a support base positioned on a support;
   an elastic supporting pad seated on the support base and made of an elastic material;

a pipe holder having an arched portion partially surrounding the pipe while the pipe is positioned on the elastic supporting pad, a flange portion of each of opposite ends of the arch portion being coupled to the support base together with the elastic supporting pad; and an elastic close-contact pad disposed between the pipe holder and an outer surface of the pipe while being brought into contact therewith by the arched portion of the pipe holder, the elastic close-contact pad being made of an elastic material, wherein two ends of the elastic close-contact pad are respectively seated on an upper surface of the elastic supporting pad, wherein the pipe is fixed in a space surrounded by the elastic supporting pad and the elastic close-contact pad, and wherein an upper part of the pipe is wrapped by the elastic close-contact pad, and a lower part of the pipe is in contact with the upper surface of elastic supporting pad having a continuous plane.

2. The device of claim 1, wherein the arched portion is configured to have an arched shape and brings the elastic close-contact pad into contact with the outer surface of the pipe, the arched portion being configured to be orthogonal to the flange portion.

3. The device of claim 2, wherein a corrugated pattern is provided on a surface of the elastic close-contact pad.

4. The device of claim 3, wherein the pattern is provided on the surface of the elastic close-contact pad being in contact with the pipe.

5. The device of claim 1, wherein the support comprises a plurality of supports located at predetermined intervals on a reinforcing member provided on the surface of the outer housing.

6. The device of claim 5, wherein the intervals between the plurality of supports are determined according to a natural frequency of the outer housing to stop the pipe from resonating with the outer housing.

* * * * *